United States Patent [19]
Welhouse

[11] Patent Number: 5,440,973
[45] Date of Patent: Aug. 15, 1995

[54] LOW-FAT NON-STICK FRYING DEVICE

[75] Inventor: Harold L. Welhouse, Two Rivers, Wis.

[73] Assignee: Anchor Hocking Corporation, Freeport, Ill.

[21] Appl. No.: 55,490

[22] Filed: Apr. 30, 1993

[51] Int. Cl.6 ............................................. A47J 37/10
[52] U.S. Cl. ........................................ 99/425; 99/422; 99/445; 126/390
[58] Field of Search ....................... 99/422, 425, 445, ; 126/390

[56] References Cited

U.S. PATENT DOCUMENTS

| | | | |
|---|---|---|---|
| 1,707,532 | 4/1929 | Moon . | |
| 2,008,767 | 7/1935 | Munn | 126/390 |
| 2,534,407 | 12/1950 | Bramberry | 126/390 |
| 4,286,136 | 8/1981 | Mason, Jr. | 99/425 |
| 4,768,427 | 9/1988 | Cheng | 99/422 |

FOREIGN PATENT DOCUMENTS 1044478 12/1978 Canada ................. 99/422

Primary Examiner—David A. Scherbel
Assistant Examiner—Randall E. Chin
Attorney, Agent, or Firm—Baker & McKenzie; James G. Staples

[57] ABSTRACT

An improved low-fat non-stick frying device or cookware is provided. The upper cooking surface of the frying device includes a textured surface comprised of a series of wave-like grooves embossed in the surface of the pan. The wave-like pattern of each groove is one-half cycle out of phase with its neighboring adjacent grooves to form an alternating pattern of outwardly extending lands and inwardly extending roots. A raised portion or elevated surface is provided on the cooking surface disposed between the outwardly extending lands. The elevated surface is the primary cooking surface and is further the location of the inevitable initial wearing of the non-stick material. The remaining non-stick material, disposed in the grooves and between the roots is not subject to abrasive action and wears at a substantially slower rate. The raised portions or elevated cooking surfaces disposed between the lands comprise less than 30 percent of the upper cooking surface and therefore less than 30 percent of the non-stick coating disposed on the upper cooking surface is exposed to the abrasive action of cooking utensils or cleaning utensils.

12 Claims, 2 Drawing Sheets

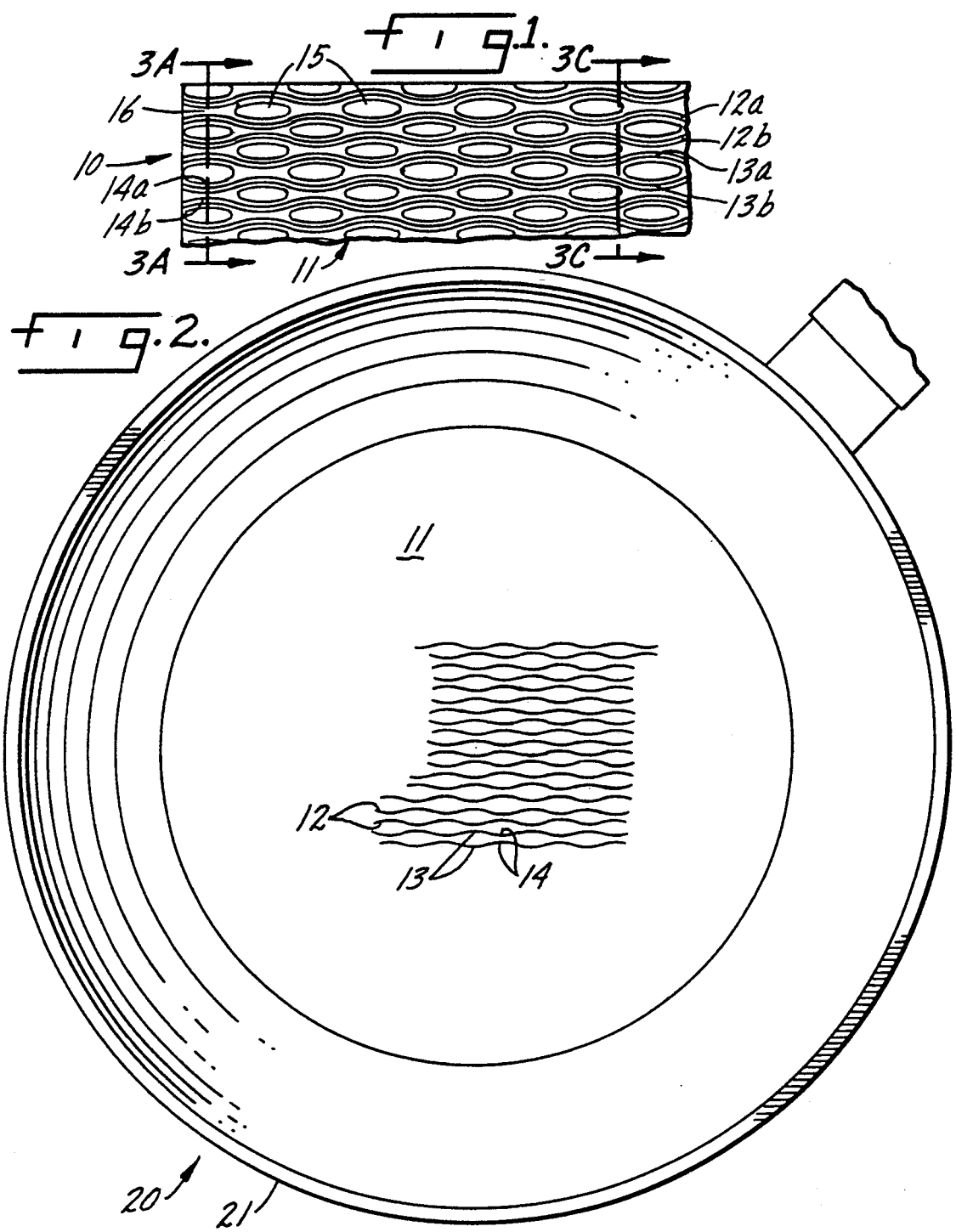

LOW-FAT NON-STICK FRYING DEVICE

This invention relates generally to cookware and specifically to cookware having a non-stick coating applied to a textured cooking surface. The configuration of the textured cooking surface provides increased life and enhanced usage for the non-stick coating as compared to conventional textured cooking surfaces.

BACKGROUND OF THE INVENTION

It has long been an objective of cookware manufacturers to provide cookware having improved strength, improved resistance to heat deformation, as well as the ability to hide scratches and other deformations. For these purposes, textured cooking surfaces are known and used. Textured cooking surfaces have also been provided for the drainage of fat and grease away from the food to lower the fat and cholesterol content of the cooked food. Textured cooking surfaces enable a cook to effectively fry food in a minimal amount of fat or grease. In recent years, non-stick coatings are frequently applied to the cooking surface to provide ease of use and make the cookware easier to clean.

However, the combination of non-stick coatings and textured cooking surfaces has always resulted in one or more drawbacks. Specifically, it is inherently difficult to provide a textured cooking surface which does not have sharp edges which tend to bind or catch a spatula or a cleaning utensil. The non-stick coating disposed on these sharp edges wears quickly and the benefits provided by the non-stick coating are compromised because the coating will quickly wear off of up to and over 50% of the surface area of conventional textured cooking surfaces.

Thus, practitioners in the art of cookware have not been very successful at combining non-stick coatings with textured cooking surfaces and there is a need for such an effective combination. Preferably, the textured surface would provide for low-fat or non-fat cooking and would also be of a geometrical configuration that would hold a non-stick coating for an extended period of time. Further, it would be highly preferable for the textured surface to retain its non-stick capabilities after portions of the non-stick coating have worn off. Such wear is inevitable, even with non-textured cooking surfaces. If an effective non-stick coating/textured surface combination could be provided, the result would have an improved textured cooking surface with an improved non-stick coating with a longer effective lifespan because the non-stick capabilities would extend beyond the inevitable initial wearing of the non-stick coating from some portions of the textured surface.

SUMMARY OF THE INVENTION

The invention is an improved textured cooking surface with a non-stick coating. The coating has a substantially increased lifespan as compared to coated surfaces disposed on conventional textured cookware.

The improved durability of the non-stick coating is accomplished through an improved textured surface and an improved method of fabricating the textured cooking surface. The result is a cooking surface which is easily and readily cleanable, because of less surface exposure to foods, and in which there is an easier release of foods as a result of the elimination of corners or sharp edges which tend to collect food. Further, the construction of the cooking surface is such that a lesser amount of oils are required to effectively fry food, and thereby the food prepared on the cookware tends to be healthier due to the lower fat content than fried food prepared on conventional surfaces.

The above objectives are met in a cooking surface that includes a series of adjacent curvilinear grooves that are fairly narrow in width and fairly narrow in depth. The grooves are disposed adjacent to each other in a side-by-side or juxtaposed fashion. Each groove includes a repeating pattern of oppositely directed undulations. The repeating pattern of undulations for each groove is approximately one-half of a cycle out of sync or out of phase with the adjacent groove. That is, two adjacent grooves can be characterized as a series of alternating roots and lands, the lands of two adjacent grooves being two undulations directed away from each other and the roots of two adjacent grooves being two undulations directed toward one another. Each set of two lands is disposed between adjacent sets of two roots. The result is a pattern of alternating roots and lands disposed between any two adjacent grooves.

Another way to describe this pattern is a series of low amplitude sinusoidal grooves disposed in the upper surface of the pan. Each sinusoidal groove is disposed between two adjacent sinusoidal grooves. Each groove is one-half of a cycle or 180° out of phase with each adjacent groove. The resulting pattern requires a positive undulation of each groove to be matched with a negative undulation of an adjacent groove. Such a pair forms two outwardly directed lands. Further, a negative undulation of each groove is paired with a positive undulation of an adjacent groove. Such a pair forms two inwardly directing undulations form two roots of two adjacent grooves. The result is two adjacent grooves forming a pattern of oppositely directed lands disposed between inwardly directed roots. The pattern applies for any two adjacent grooves.

The area disposed between two oppositely directed lands provides an elevated surface or raised portion that is disposed at a higher elevation than the bottom of the grooves and at a higher elevation than the portions of the cooking surface disposed between two inwardly directing roots. In the preferred embodiment, these raised portions, which can also be thought of as plateaus, are of an elliptical or oblong in configuration. The surface area represented by these elliptical raised portions is less than one-third and preferably less than 30% of the total surface area provided by the coated textured cooking surface.

A non-stick cooking material is applied evenly to the entire cooking surface of the pan. Because the raised portions disposed between adjacent outwardly directed lands are disposed above the remainder of the cooking surface, these raised portions engage cooking and cleaning utensils with a higher frequency and a higher intensity than the remainder of the cooking surface. Accordingly, the non-stick cooking material will wear first from these raised portions. However, the non-stick capabilities of the frying pan are not unduly compromised by the wearing of the non-stick material from the raised portions disposed between the lands.

As will be shown below, the raised portions comprise less than ⅓ and preferably less than 30% and more preferably less than 27% of the total surface area of the upper cooking surface. Thus, a wearing of the non-stick cooking material from a mere 30 or 27 percent of the total cooking surface will not unduly compromise the total non-stick qualities of the pan. Food will still engage the remaining non-stick cooking material disposed between two roots and in the grooves. Because non-stick cooking material will still coat at least 70 percent of the cooking surface of the pan, the pan still has effective non-stick capabilities and is easy to clean. Further, food is more likely to get stuck or caught in the grooves and between two roots and therefore the non-stick material will last the longest on those areas of the cooking surface where the non-stick material is needed most.

Thus, the frying pan of the present invention is more durable in that it retains its non-stick qualities longer than conventional pans that combine non-stick surfaces with textured surfaces. As with other devices taught in the prior art, the non-stick material will wear. However, the non-stick material will wear on a small fraction of the total cooking surface and further the non-stick material is retained in the surfaces where the non-stick material is needed most: namely the narrow areas between the roots and in the grooves where food is most likely to get lodged.

The present invention also lends itself to an improved method of fabricating textured cookware. Metal is supplied in roll form and is subjected to an embossing operation which results in the disposition of the above-described grooves, lands and roots in the upper surface of the metal. The now-textured metal is pressed into the desired cookware shape, such as a eight or ten-inch frying pan. The non-stick coating is then applied to the metal surface, which serves as the upper cooking surface.

It is therefore an object of the present invention to provide an improved frying pan device that effectively combines the qualities of textured cooking surfaces with non-stick coatings.

It is yet another object of the present invention to provide an improved frying pan with a durable textured surface that maintains its non-stick qualities longer than the devices taught in the prior art.

Still another object of the present invention is to provide an improved cooking device with an upper cooking surface that tolerates some wear of the non-stick coating material without unduly compromising the total non-stick qualities of the pan.

Another object of the present invention is to provide an improved combination textured cooking surface/non-stick cooking surface with improved durability.

Another object of the present invention is to provide an improved combined textured cooking surface/non-stick cooking surface that is easy to clean.

Other objects and advantages of the invention will become apparent upon reading the following detailed description of the drawings and appended claims, and upon reference to the accompanying drawings.

BRIEF DESCRIPTION OF THE DRAWINGS

The invention is illustrated more or less diagrammatically in the accompanying drawing wherein:

FIG. 1 is a top plan view of a sheet of cooking surface material before it is fabricated into a cookware item;

FIG. 2 is a top plan view of the cooking surface of a cookware item, in this instance a frying pan, made in accordance with the present invention;

DETAILED DESCRIPTION OF THE DRAWINGS

Figure 3A:
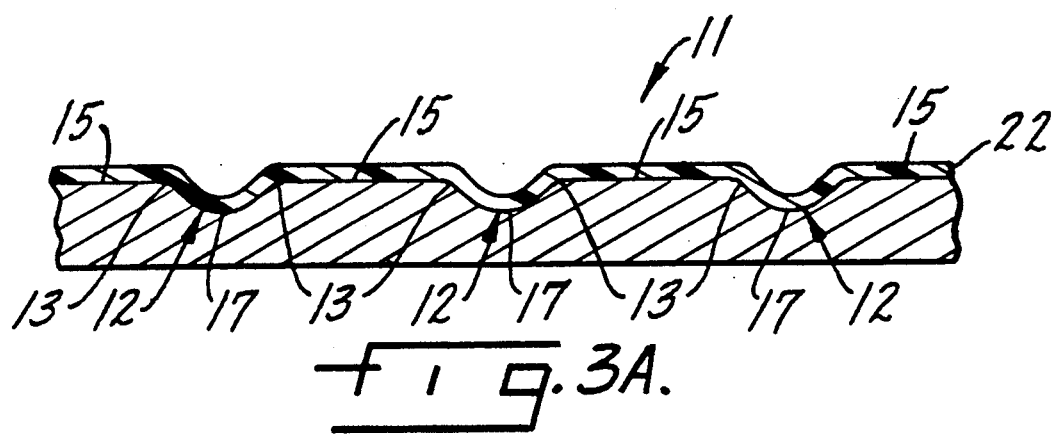
FIG. 3A is a vertical cross-sectional view taken along line 3A—3A of FIG. 1 of the interior surface of the cookware item in a new or an as-manufactured condition.

Like reference numerals will be used to refer to like or similar parts from Figure to Figure in the following description of the drawings.

The present invention is best understood upon consideration of how cookware items embodying the present invention are made. First a section of metal 10 in roll-form is forcibly engaged with an embossing roll (not shown) and the textured surface 11 is produced. FIG. 1 illustrates only a small section of metal 10; in actual practice, large rolls of metal are fed through an embossing apparatus that includes an embossing roller. Embossing is the preferred, but not only, method of inscribing the textured pattern onto the surface 11. Other options include coining, stamping and pressing. However, embossing is known to provide the configuration described below and therefore is preferred for the reasons stated below.

Figure 3B:
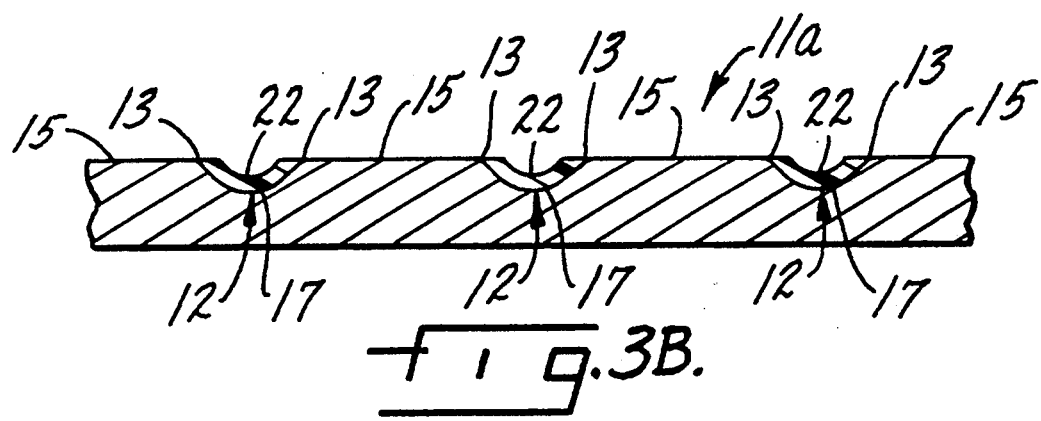
FIG. 3B is a vertical cross-sectional view taken along line 3A—3A of FIG. 1 of the interior surface of a cookware in a condition after an extended period of normal use, particularly illustrating contemplated wear patterns of the non-stick coating.

The textured surface 11 includes a series of curvilinear channels such as those shown at 12 in FIGS. 1, 3A, and 3B and more specifically at 12a, 12b in FIG. 1. The channels 12a, 12b will be discussed in detail for purposes of illustration and it will be noted that the channels 12a, 12b represent a portion of the continual pattern of channels 12 that extends across the textured surface 11.

Each channel 12a, 12b is wave-like or sinusoidal in configuration and further each channel 12a is one-half a cycle or 180° out of phase with its adjacent channel 12b. The result is a sequence of undulations 13a and 13b that extend outward from each other and a sequence of undulations 14a and 14b that extend inward toward each other without meeting. The outwardly extending undulations 13a, 13b are also known as lands 13a, 13b and the inwardly extending undulations 14a, 14b are also known as roots 14a, 14b.

An elliptical, oblong or oval area 15 is disposed between each pair of lands 13a, 13b. While not illustrated due to the limitations of a two-dimensional drawing, it will be noted that the areas 15 or the raised portions 15 are disposed higher or are of a higher elevation than the areas 16 disposed between two roots. Both the raised portions 15 and the surface areas 16 disposed between two roots 14a, 14b are of a higher elevation than the bottoms 17 of the channels 12 (see FIGS. 3A and 3B). Thus, in terms of vertical elevation, the raised portions 15 are the higher than both the areas 16 and the channel 12 with the areas 16 being higher than the channels 12.

In the preferred embodiment, the raised portions 15 are disposed between about 0.005" and 0.007" above the bottoms 17 of the channels 12 and preferably not too far above about 0.012" above the bottoms 17 of the channels 12. The elevation of the areas 16 bound by the roots 14 is about 0.002" above the channels 12. The thickness of the non-stick coating should be between about 0.001"

and about 0.002" and preferably from about 0.0013" to about 0.0014".

Turning to FIG. 2, a piece of ordinary cookware, in this instance a frying pan, is indicated generally at 20. The frying pan 20 includes an exterior side or outer periphery 21. The upper cooking surface, shown generally at 11, includes the texture pattern illustrated by the series of undulating, curvilinear or sinusoidal channels 12. The elliptical raised portions 15 and the actual width of the channels 12 are not indicated in FIG. 2 due to the limitations of this type of two-dimensional drawing and reference should be made to FIGS. 1, 3A and 3B as well as this description.

Turning to FIGS. 3A and 3B, examples of a new cooking surface 11 and a used cooking surface 11a are illustrated. In FIG. 3A, the surface 11 includes an even coat of non-stick material 22. The coat of material 22 is evenly distributed over the raised portions 15 disposed between the lands 13 as well as in the grooves or channels 12. In FIG. 3B, the non-stick material 22 has worn off of the raised portions 15 because the raised portions 15 are subject to more frictional contact with food, spatulas, other cooking utensils and cleaning utensils.

However, in FIG. 3B, it will be noted that the channels 12 and the bottoms 17 of the channels 12 still carry a coating of non-stick material 22. Further, while not shown in FIGS. 3A and 3B, the areas 16 disposed between two roots 14 (see FIG. 1) will also still carry a coating of non-stick material 22 due to the lower elevation of the areas 16 as compared to the raised porions 15. Thus, the non-stick coating 22 disposed in the channels 12 and in the areas 16 will not readily wear off and, in fact, will be protected from cooking and cleaning utensils due to the lower elevation the channels 12 and areas 16 in comparison to the raised portions 15. In effect, the raised portions 15 protect the non-stick material 22 disposed in the channels 12 and areas 16 from wear.

Figure 3C:
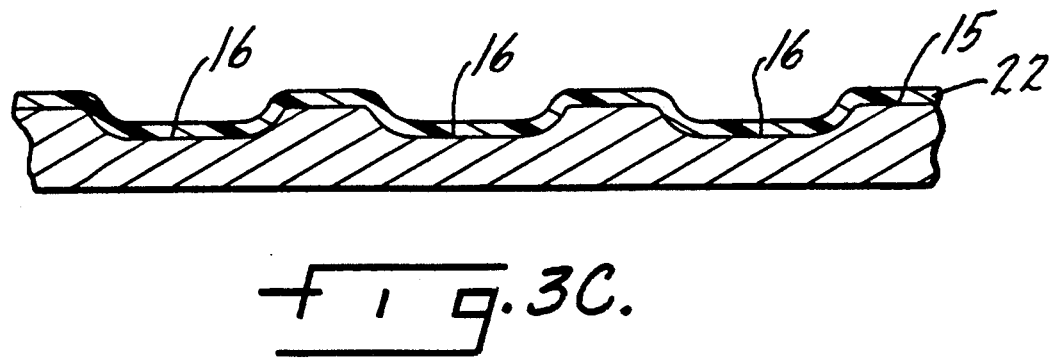
FIG. 3C is a vertical cross-sectional view taken along line 3C—3C of FIG. 1 of the interior surface of the cookware item in a new or an as-manufactured condition.
Figure 3D:
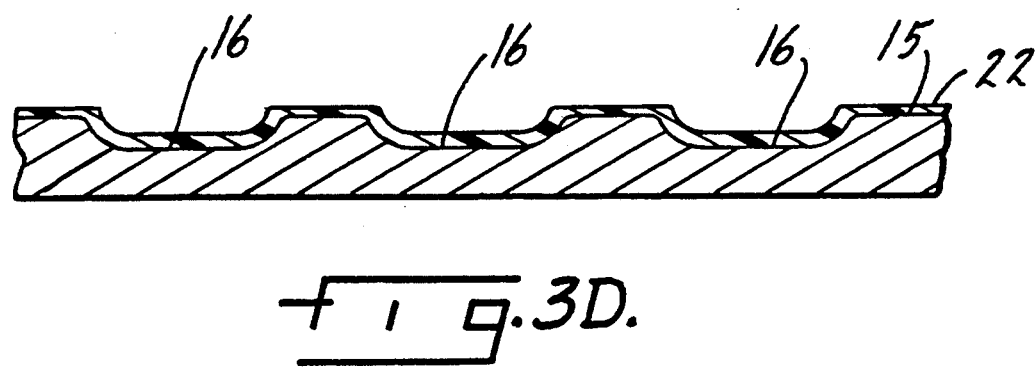
FIG. 3D is a vertical cross-sectional view taken along line 3C—3C of FIG. 1 of the interior surface of the cookware in a condition after an extended period of normal use, particularly illustrating contemplated wear patterns of the non-stick coating.

FIG. 3C is a cross-sectional view taken along the line 3C—3C of FIG. 1 and particularly illustrating a cross-sectional view of the narrow ends of the raised portions 15. FIG. 3D is a cross-sectional view taken along line 3C—3C which illustrates the wear pattern for a typical raised portion 15. Specifically, comparing FIG. 3B with FIG. 3D, it will be understood that the central area of the raised portions 15 as seen in FIG. 3B will wear faster and more prominently than the narrow end area of the raised portions 15 as shown in FIG. 3D. That is to say, the narrow end areas of the raised portions 15 will carry a thin layer of non-stick material 22 even when the central areas as shown in FIG. 3B are completely worn. In this way, the textured cooking surface 11 of the present invention retains at least some of the non-stick cooking surface even after extended use and will perform for a longer period of time than other textured cooking surfaces carrying non-stick coatings that are known in the art.

Further, it will be noted from FIGS. 3C and 3D that the depressed areas indicated at 16 in FIG. 1 comprise the areas between two adjacent routs and because these areas are disposed substantially below the raised portions 15, the areas indicated at 16 will also maintain their non-stick coating 22 through extended use. Thus, between the depressed area 16, the channels 12 and the narrow end areas of the raised portions 15, the textured cookware of the present invention maintains a substantial amount of non-stick coating long after other textured cooking surfaces have lost their respective non-stick coatings.

The result is a two-fold benefit. First, only the coating 22 disposed on the raised portions 15 wears first. This initial wear does not unduly compromise the non-stick qualities of the cookware 20 because the raised portions 15 constitute less than one-third and preferably less than 30% of the total surface area of the cooking surface area 11. Thus, after extended use, the pan 20 will still have at least 70% of the non-stick coating 22 left.

Second, the non-stick coating 22 remains in the areas where food is most likely to get lodged and stuck, namely in the channels 12 and in the areas 16 between the roots 14. Thus, even though the non-stick coating 22 wears off of the flat plateau-like regions 15, the coating will not wear off of the nooks and crannies such as the channels 12 and areas 16 that actually trap the food. With the design disclosed by the present invention, the non-stick, easy-to-clean qualities initially provided by the pan 20 will substantially outlast the useful lives of conventionally coated-textured fry pans.

Although only one embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

I claim:

1. An improved low-fat non-stick frying device including a base having an upper cooking surface, the improvement residing in the upper cooking surface, the upper cooking surface comprising:

a series of adjacent curvilinear grooves which are narrow in width and depth, the grooves being disposed in the upper cooking surface in a side-by-side fashion, each groove being characterized as a series of alternating and oppositely directed undulations, each groove and the groove adjacent to it further being characterized as a series of alternating roots and lands, the lands of each groove and the lands of each adjacent groove being defined as adjacent undulations that curve outwardly from each other without meeting, the roots of each groove and the roots of each adjacent groove being defined as adjacent undulations that curve inwardly toward each other without meeting, the cooking surface disposed between two adjacent lands being further characterized as including a raised portion, two adjacent grooves providing a series of raised portions disposed between the adjacent lands that are disposed between adjacent roots, the cooking surface disposed between two adjacent roots being further characterized as including a depressed portion, two adjacent grooves providing a series of depressed portions disposed between the adjacent roots that are disposed between adjacent lands, the cooking surface carrying a coating of non-stick material, the non-stick material disposed on top of the raised portions will engage cooking utensils, cleaning utensils and food to a greater extent than the non-stick material disposed in the grooves and between adjacent roots or between adjacent raised portions.

2. The upper cooking surface of claim 1, wherein the raised portions are elliptical in configuration.

3. The upper cooking surface of claim 2,
wherein the raised portions are further characterized as having two opposingly directed narrow ends, the narrow ends being directed toward two roots of two adjacent grooves.

4. The upper cooking surface of claim 3,
wherein the raised portions are further characterized as comprising between 20 and 30 percent of the total surface area of the upper cooking surface.

5. The upper cooking surface of claim 4,
wherein the raised portions are further characterized as comprising less than 30 percent of the total surface area of the upper cooking surface.

6. The upper cooking surface of claim 5,
wherein the grooves are deposited in the upper cooking surface by forcibly engaging an embossing roll with the upper cooking surface prior to shaping the cooking surface into a cookware device.

7. An improved low-fat non-stick frying cookware device including a base having an upper cooking surface, the improvement residing in the upper cooking surface, the upper cooking surface comprising:
a series of adjacent sinusoidal grooves which are narrow in width and depth, the grooves being disposed in the upper cooking surface in a juxtaposed relationship with one another, each groove being disposed between two adjacent grooves,
each sinusoidal groove being characterized as a series of alternating and oppositely directed undulations, each undulation being directed toward an adjacent groove and away from an adjacent groove, any two adjacent grooves being characterized as a series of alternating roots and lands, the lands of two adjacent grooves being defined as adjacent undulations that curve outwardly from each other without meeting, the roots of two adjacent grooves being defined as adjacent undulations that curve inwardly toward each other without meeting,
the portions of the cooking surface disposed between two adjacent lands being further characterized as including a raised portion, two adjacent grooves providing a series of raised portions disposed between the adjacent lands that are disposed between adjacent roots,
the cooking surface disposed between two adjacent roots being further characterized as including a depressed portion, two adjacent grooves providing a series of depressed portions disposed between the adjacent roots that are disposed between adjacent lands,
the cooking surface carrying a coating of non-stick material,
the non-stick material disposed on top of the raised portions will engage cooking utensils, cleaning utensils and food to a greater extent than the non-stick material disposed in the grooves and between adjacent roots or between adjacent raised portions.

8. The upper cooking surface of claim 7,
wherein the raised portions are oblong in configuration.

9. The upper cooking surface of claim 8,
wherein the raised portions are further characterized as having two opposingly directed narrow ends, the narrow ends being directed toward two roots of two adjacent grooves.

10. The upper cooking surface of claim 9,
wherein the raised portions are further characterized as comprising between 20 and 30 percent of the total surface area of the upper cooking surface.

11. The upper cooking surface of claim 10,
wherein the raised portions are further characterized as comprising less than 30 percent of the total surface area of the upper cooking surface.

12. The upper cooking surface of claim 11,
wherein the grooves are deposited in the upper cooking surface by forcibly engaging an embossing roll with the upper cooking surface prior to shaping the cooking surface into a cookware device.

* * * * *